United States Patent [19]

Forys

[11] 4,421,997
[45] Dec. 20, 1983

[54] MULTIPLE AXIS ACTUATOR

[75] Inventor: Edward L. Forys, Covina, Calif.

[73] Assignee: McDonnell Douglas Corporation, Long Beach, Calif.

[21] Appl. No.: 321,083

[22] Filed: Nov. 13, 1981

Related U.S. Application Data

[63] Continuation of Ser. No. 943,063, Sep. 18, 1978, abandoned.

[51] Int. Cl.³ .............................................. H02K 41/02
[52] U.S. Cl. ..................................... 310/12; 318/115; 318/135; 336/232
[58] Field of Search ................................. 310/12–15, 310/27; 318/135, 115; 336/200, 232

[56] References Cited

U.S. PATENT DOCUMENTS

| Re. 25,305 | 12/1962 | Haydon . | |
|---|---|---|---|
| 2,843,825 | 7/1958 | Lush . | |
| 3,169,241 | 2/1965 | Aiken . | |
| 3,325,821 | 6/1967 | Reese et al. . | |
| 3,373,272 | 3/1968 | Saraga . | |
| 3,376,578 | 4/1968 | Sawyer . | |
| 3,416,535 | 12/1968 | Kalthoff et al. | 310/ |
| 3,416,535 | 12/1968 | Kalthoff et al. . | |
| 3,469,180 | 9/1969 | Anderson . | |
| 3,576,359 | 4/1971 | Cosh . | |
| 3,591,815 | 7/1971 | Grootenhuis . | |
| 3,668,443 | 6/1972 | Schwartz . | |
| 3,736,543 | 5/1973 | Ladermann | 336/232 X |
| 3,771,034 | 11/1973 | Wallskog . | |
| 3,848,210 | 11/1974 | Felkner . | |
| 3,851,196 | 11/1974 | Hinds . | |
| 4,246,446 | 1/1981 | Yoshida et al. | 336/200 |
| 4,313,151 | 1/1982 | Uranken | 336/232 X |
| 4,313,152 | 1/1982 | Vranken | 336/232 X |

*Primary Examiner*—Donovan F. Duggan
*Attorney, Agent, or Firm*—Henry M. Bissell; Donald L. Royer

[57] ABSTRACT

A multi-axis actuator which provides force along three translational and two rotational axes through the interaction of multiple windings on a single platen which interact with the poles of a magnetic member spaced apart a sufficient distance to allow linear and rotational motion. Said poles are disposed in a parallel relationship to said platen thereby causing a magnetic field to impinge a portion of said platen at right angles thereto. Further, said windings may be disposed so as to generate linear force only, rotational force only, single or multiple translational forces only or force about rotational axes only or any combinations of the foregoing necessary for the desired force generation.

20 Claims, 7 Drawing Figures

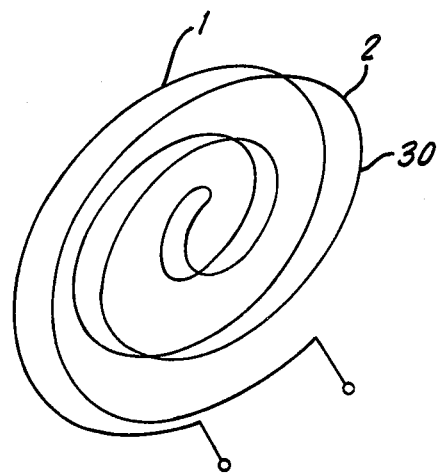
FIG_1
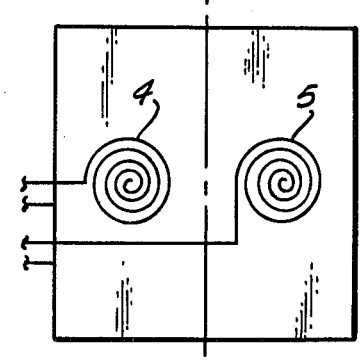
FIG_3A
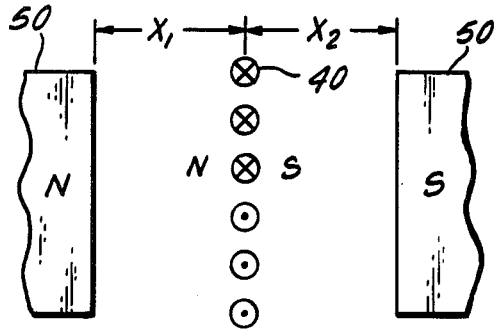
FIG_2A
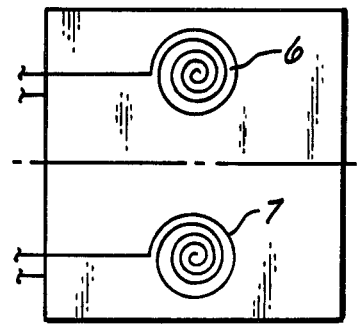
FIG_3B
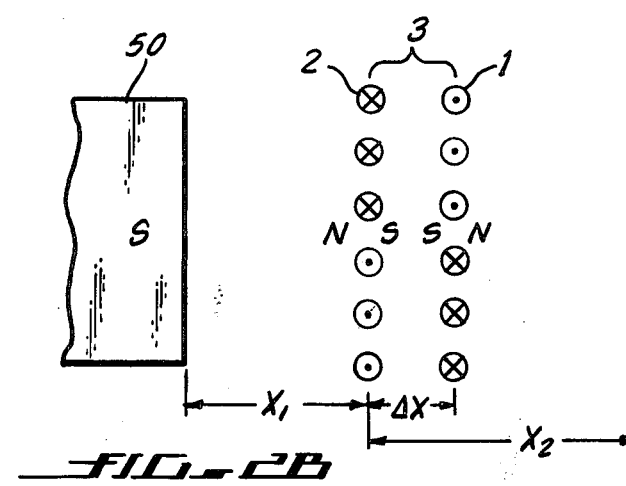
FIG_2B

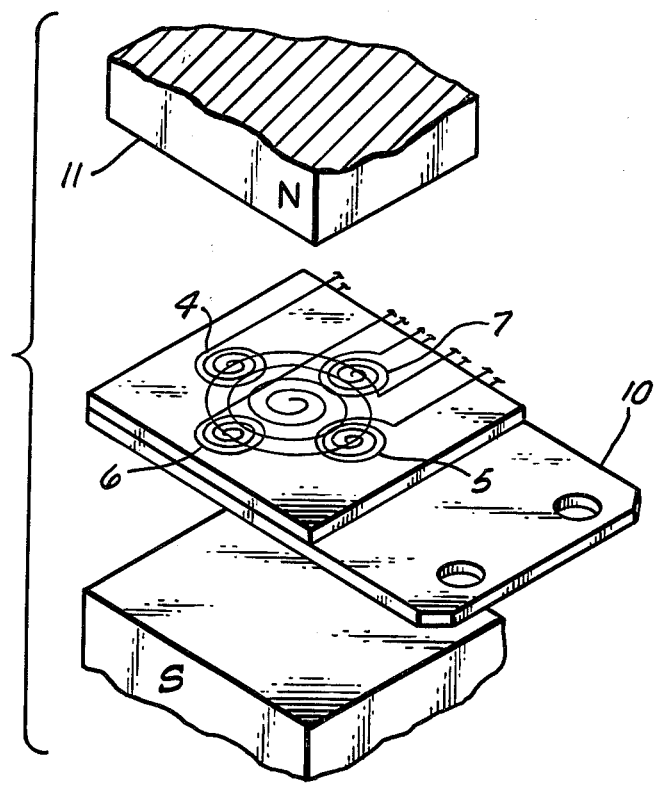
FIG_4
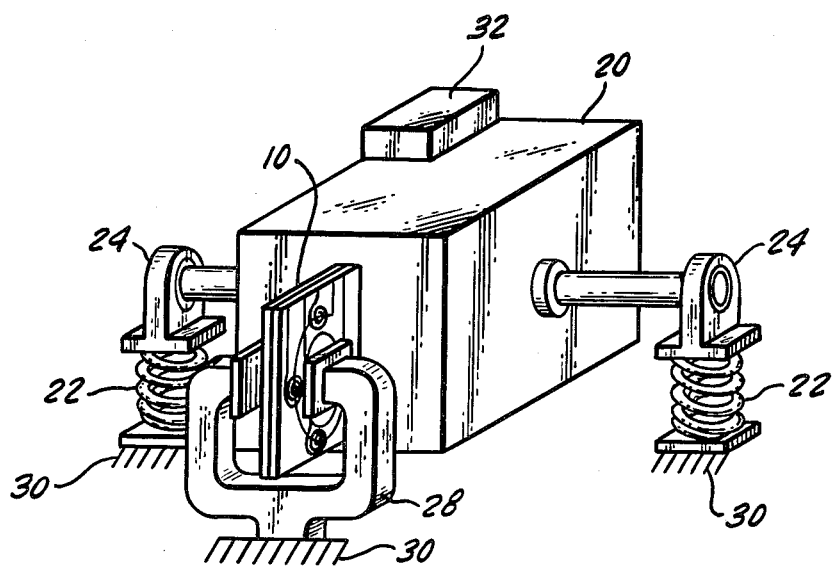
FIG_5

MULTIPLE AXIS ACTUATOR

This is a continuation of application Ser. No. 943,063, filed Sept. 18, 1978 now abandoned.

BACKGROUND OF THE INVENTION

The field of this invention relates generally to linear motor and rotational motor structures. More specifically, this invention relates to linear and rotational actuators utilized in the isolation of platforms in inertial stabilization systems. Prior art attempts at producing actuators for such stabilizing systems have been directed primarily to rotational motor systems as well as single axis actuator systems which utilize a very narrow gap magnetic element. This resulted in a cumbersome structure which required numerous individual linear actuators, one for each translational axis of motion desired and additional combinations thereof if rotational motion is desired.

SUMMARY OF THIS INVENTION

Since it is the object of isolation platforms to isolate translational as well as rotational motions caused by vibration of the mounting platform which supports the isolation platforms, the primary concern becomes one of eliminating short stroke motions. Accordingly, actuators used may be short stroke actuators of the linear or rotational variety. The armature of the actuator of the instant invention is mounted on a platen which in turn is mounted to the vibrating structure. Wide gap magnets for interaction with said platen are mounted to the structure to be isolated. Such magnets may be either electromagnets or permanent magnets. It should be noted that reverse mounting does not affect the operation.

The novel structure provides windings on a platen disposed between the poles of such magnets which generate magnetic fields which in turn attract or repel portions of such platen from said poles in a controlled manner. Specifically, the platen contains a double winding arranged in a spiral configuration lying in a plane substantially parallel to the pole faces. Current driven through such windings in a controlled manner is used to generate force along an axis perpendicular to current flow. The individual spirals of said double winding are displaced from one another by a predetermined distance and lie in parallel planes adjacent one another. When a voltage is applied to said windings current passes through a first spiral in one direction and generates a first resultant magnetic field normal to the plane of the winding. The current continues through the second winding in a direction opposite its direction of travel in said first winding and generates an opposing resultant magnetic field also normal to the plane of the winding. The incremental spacing or the difference in position of the two windings prevents the total cancellation of either of the resultant magnetic fields, thereby creating a residual magnetic field. When viewed external of said windings the magnetic field from either side of the windings appears to be of one polarity. This will cause attraction of one side of the windings towards one pole of said magnet and a repulsion of the opposite side from the opposite pole, thereby causing the platen upon which the windings are mounted to be attracted to one pole of the magnet and repelled from the other. Hence force is generated along a line substantially parallel to the magnetic field flux lines of the magnets. Force in the opposite direction is accomplished by simply reversing the direction of current in the windings. When the spiral configuration is combined with a two axis platen, force along three translational axes is accomplished. A plurality of such spirals lying in the same plane but adjacent one another may be used to cause rotational force of the platen relative to the magnetic poles by causing adjacent pairs of said windings to generate apparent magnetic fields of opposite polarity, thereby attracting one side of said platen to one magnetic pole and the opposite side of said platen to the opposite pole. Disposing said adjacent pairs of such windings at 90 degrees to one another as viewed along a line normal to the plane of such windings adds additional rotation force about a second axis disposed 90 degrees from the first axis of rotation. Thus, a platen having two linear windings disposed at 90 degrees to one another for providing two translational axes of force, a single double winding spiral lying in a plane parallel to the plane of the first two axes for a third translational axis of force perpendicular to the first two translational axes, and two pairs of double spiral windings disposed at 90 degrees to one another for providing two rotational axes of force, allows force to be applied over five or more controlled axes, three translational and two rotational axes.

Having thus described the invention, it is an object thereof to provide an actuator operable over both translational and rotational axes. It is a further object of this invention to provide a translational type actuator operating on a rotational axis. It is a further object of this invention to provide a linear actuator which operates on short stroke motions parallel to magnetic lines of force. When used herein "perpendicular" means disposed 90 degrees from one another when veiwed along a line normal to the surface of the planes within which the various elements lie and does not require actual intersection. Principles and advantages of this invention may be more fully understood by reference to the drawings and specific description hereinafter set forth.

BRIEF DESCRIPTIONS OF THE DRAWINGS

FIG. 1 is an objective view of the double spiral winding in space.

FIG. 2a is a pictorial view of a single current carrying winding disposed between magnetic poles.

FIG. 2b is a pictorial view of a double winding carrying current in opposite directions disposed between magnetic poles.

FIG. 3a and b are a planar views of two pairs of windings adjacent one another in both vertical and horizontal dispositions.

FIG. 4 is a pictorial view of a platen having multiple windings disposed between magnetic poles.

FIG. 5 is a pictorial view of an isolation system utilizing the actuator of the instant invention.

SPECIFIC EMBODIMENT

With reference to the drawings, FIG. 1 is an illustration of the manner in which the double spiral winding 30 is produced showing an upper winding 1 and a lower winding 2, produced from a single strand of wire which is looped at the center of the spiral to form loops having strands of wire adjacent to one another and concentric with each other. It is understood that the drawing is illustrative only and that the number of turns depends upon a particular magnitude of field desired, size of wire, and so on. With reference to FIG. 2, the spiral windings may be observed disposed equidistant between the poles of a magnetic member 50. Region 3 illustrates the distance between upper winding 1 and lower winding 2 which are here observed along a radial line of the spiral in cross section. Each of the sections shown illustrates the direction of current flow, using a dot to illustrate current flowing out of the page and an X to show current flowing into the page. Thus, it may be noted from the configuration shown, the windings generate magnetic fields which oppose one another. Since the windings are embedded in a rigid epoxy medium, they remain stationary relative to one another even though opposing fields are generated. External of this winding package, the spiral configuration appears to generate the same polarity magnetic field on either side of the windings. This is due to the fact that the spacing, region 3, prevents total cancellation of the magnetic fields beyond said windings. Thus, when a voltage is applied to said windings, current first passes through spiral 1 in one direction and generates a first magnetic field and since the spirals are composed of one strand of wire which is essentially folded back on itself, the current continues through winding 2 in a direction opposite its direction of travel in winding 1 and thereby causes the generation of opposing magnetic field. The displacement of these fields causes the appearance of residual magnetic fields external of said windings of one polarity. The force developed by the double spiral herein disclosed can be verified by considering first the force upon a single winding structure 40 as shown in FIG. 2a disposed between the poles of a magnetic member 50.

The force developed on the spiral axially is described in "Magnetic Circuits and Transformers" published by M.I.T. in 1957 as the force between magnetic poles and is given by the expression:

$$F \propto (B_a^2 A / \mu_a) \quad 1.0$$

Where:
F = Force on the spiral
$B_a$ = Magnetic flux density in the air gap
A = Area of the air gap
$\mu a$ = Permeability of air
it is also known that:

$$\phi = mmf/R$$

Where:
$\phi$ = Total flux
mmf = Magnetomotive force
R = Reluctance of magnetic circuit
It is further known that:

$$\phi = B_a A; \text{ and}$$

$$mmf = 4\pi NI; \text{ and}$$

$$R = 1/\mu A,$$

Where
I = current in amps
NI = ampere turns
l = Length of gap
Therefore it follows that:

$$B_a = \phi A = mmf/RA = 4\pi NI/RA = 4\pi NI\mu_a A/lA \quad 2.0$$

Since Area terms cancel equation 2.0 becomes:

$$B_a = 4\pi NI\mu_a/l \quad 2.1$$

Substituting equation 2.1 into equation 1.0 yields:

$$F \propto (4\pi NI\mu_a/l)^2 A/\mu a = 16\pi^2 N^2 I^2 \mu_a^2 A/l^2 \mu a \quad 1.1$$

Therefore:

$$F = C_1 I^2 / l^2 \quad 1.2$$

Where $C_1$ is some constant.

Since there are two poles N and S as shown in FIG. 2a the net force on the winding is given by the expression:

$$F_n = C_1 I^2/(x_1)^2 - C_1 I^2/(x_2)^2 \quad 3.0$$

For two windings spaced apart delta x as shown in FIG. 2b the net force is given by the expressions:

$$F = F_1 - F_2 \text{ or} \quad 4.0$$

$$F_N = \frac{C_1 I^2}{(x_1)^2} - \frac{C_1 I^2}{(x_2)^2} - \frac{C_1 I^2}{(x_1 + \Delta x)^2} + \frac{C_1 I^2}{(x_2 - \Delta x)^2} \quad 4.1$$

Resolving the terms of equation 4.1 yields:

$$F_N = \frac{2C_1 I^2 \Delta x((x_1)^3 + (x_2)^3 + 2(x_1)^2 \Delta x - 2(x_2)^2 \Delta x)}{x_1 x_2 (x_1 + \Delta x)^2 (x_2 - \Delta x)^2} \quad 4.2$$

Since the actuator may be of a wide gap type and the distance between windings is small i.e. on the order of one wire diameter, $\Delta x$ terms which are orders of magnitude smaller than $x_n$ terms can be ignored and therefore equation 4.2 becomes:

$$F_N = 2CI^2 \Delta x ((x_1)^3 = (x_2)^3))/(x_1)^3 (x_2)^3 \quad 4.3$$

Further where short stroke motion compensation is contemplated the distances $x_1$ and $x_2$ do not appreciably change and therefore $F_N$ is simply:

$$F_N = C_2 I^2 \quad 4.4$$

which illustrates that force is essentially a function of current and directly proportional thereto. This relationship allows excellent electronic control of actuators constructed in accordance with this invention. It is clear in the specific case shown in FIG. 2b that the winding will be attracted towards the south magnetic pole and repelled from the north magnetic pole, thereby generating force to the left. A reversal of the current will cause a reversal of the magnetic fields generated and thus will cause attraction of the winding to the north magnetic pole and repel it from south magnetic pole and thus cause force to the right. FIG. 3 is illustrative of pairs of smaller double windings disposed on the platen displaced from one another eight horizontally as shown in FIG. 3a or vertically as shown in FIG. 3b. Actually, such windings may be positioned in any configuration depending upon the axis of force desired. These windings are identical to that shown in FIG. 1, although only one spiral winding 1 is shown. It is noted that the winding 2 is on the opposite side of said rigid epoxy medium and is not shown in the interest of simplicity. It may be readily noted in FIG. 3a that the application of current in one direction on winding 4 and the application of current in the opposite direction on winding 5 would cause one portion of the platen to be attracted to one pole and the other portion of the platen to be attracted to the opposite pole. This generates rotational force about an axis transverse to the line intersecting the center of the two windings. In the case of FIG. 3a, opposing currents will generate rotational force about a vertical axis through the platen, similarly in FIG. 3b, opposing currents through windings 6 and 7, respectively, will generate a torque or rotational force about a horizontal axis. In FIG. 4, a combination of windings as shown in FIG. 1 with the windings of both FIG. 3a and 3b allows the generation of rotation forces of platen 10 about at least two axes and one translational force of platen 10 parallel to lines of force between magnetic pole pieces 11. In an isolation system, as shown in FIG. 5, an illustrative system is shown having a platform 20 supported by linear decoupling member 22, angular decoupling members 24, a platen 26 having double winding 30 and adjacent windings 4 and 5 and 6 and 7 as illustrated in FIG. 4 disposed between the poles of magnetic member 28. It may be readily noted that in this configuration, the rotational forces as well as translational force parallel to the magnetic lines of force may be applied to the platform in order to stabilize the same. The size of the poles has been reduced so as to reveal the windings; however, it should be understood that good control is achieved by having pole faces very nearly equal in size to the winding distribution of the platen. It is also understood that the apparatus for motion detection may be any conventional system and that suitable control means are within the state of the art for providing controlled application of current to such windings.

Typically, sensors 32 are mounted on the platform 20 which detect relative motion of said platform, said platform being supported by mechanical ground 31. This motion may be either translational or rotational motions of various magnitudes. The sensors 32 may comprise a gyro which is able to detect relatively low frequency motion, such as change in attitude, and an angular accelerometer, which is able to respond to high frequency motions occasioned by shocks and vibrations. These sensors then generate signals which are proportional to the motion sensed, which are in turn applied to a controller. The controller after suitable calculation applies a current to the windings of the actuator sufficient to generate a magnetic field to interact with the field of the magnetic member in opposing the sensed motion, thereby cancelling the same.

What is claimed is:

1. A force producing apparatus comprising:
   a. a single pair of opposed magnetic poles for establishing a monogeneous magnetic field having flux lines aligned in the same direction from pole to pole; and
   b. means for producing force in a direction substantially parallel to the flux lines of said magnetic field comprising at least a pair of electrically conductive spiral windings positioned within said magnetic field for interacting therewith, the windings of said pair being wound in like directions in adjacent parallel planes generally orthogonal to said flux lines and connected together at the inner ends of the spirals, said windings being displaced from each other in a direction aligned with the magnetic field by a predetermined distance sufficient to develop, when the windings are energized, like magnetic poles on opposite sides of said winding pair for interacting with said magnetic field to develop a force in the direction of said field.

2. A force producing apparatus as described in claim 1 wherein said means for producing force substantially parallel to the flux lines of said magnetic field further comprises:
   a. a first loop of electrically conductive material lying in a plane substantially perpendicular to said flux lines,
   b. a second loop of electrically conductive material lying in a plane substantially parallel to the first loop but spaced apart therefrom, and
   c. means for connecting said first and second loops to an external circuit.

3. A force producing apparatus as described in claim 2 wherein said first and second loops are so constructed and arranged that when current is driven through said loops opposing magnetic fields are generated for the two loops.

4. A force producing apparatus as described in claim 3 wherein current in said first loop travels in a direction opposite to current in adjacent portions of said second loop.

5. A force producing apparatus as described in claim 4 wherein said loops are connected in series with each other.

6. A force producing apparatus as described in claim 5 wherein said loops are spirals of wire connected at the center of said spirals.

7. A force producing apparatus as described in claim 1, 2, 3, 4, or 6 wherein the force producing means comprises:
   a. means for producing a torsional force about at least one rotational axis which is generally perpendicular to the flux lines of said magnetic field.

8. A force producing apparatus as described in claim 7 wherein said means for generating force about at least one rotational axis further comprises: at least an additional spiral winding pair mounted on a generally planar platen with said spiral windings, the windings of said additional pair being adjacent one another but on opposite sides of the platen and connected together in series circuit, said additional winding pair being displaced along the platen from said first-mentioned spiral windings but between said single pair of magnetic poles, such that when magnetic fields of different polarity are generated in said winding pairs, force is generated about an axis lying between winding pairs of different polarity magnetic fields.

9. A force producing apparatus as described in claim 8 wherein additional spiral winding pairs are mounted in adjacent pairs one for each rotational axis selected, and having the line of intersection between centers of such adjacent pairs transverse to such lines of intersection of other adjacent pairs.

10. An actuator for inertial stabilization systems comprising:
    a. a magnetic member having two opposed poles,
    b. a generally planar platen mounted between said poles and aligned transversely to a line between said poles, and
    c. at least one double loop spiral winding attached to said platen within the field of said poles, the respective spiral loops of said winding being electrical conductors wound in like direction and mounted on opposite sides of the platen in adjacent parallel planes displaced from each other by a predetermined distance sufficient to develop a pair of like magnetic poles on opposite sides of the platen when the winding is energized, said like poles interacting with the field of said opposed poles to develop a force between the platen and said opposed poles along the line between said opposed poles.

11. An actuator for inertial stabilization systems as described in claim 10 wherein said double winding is disposed in a planar configuration having continuous concentric loops adjacent one another.

12. An actuator for inertial stabilization systems as described in claim 10 wherein
said double winding is configured as a pair of spiral wires attached together at one end, at the center of said spiral, thence extending outwardly in ever increasing radial distance until the opposed ends are attached to a pair of terminals said spiral wires being spaced apart a predetermined distance, whereby opposing magnetic fields are generated by said spiral wires and by partial mutual cancellation cause a net field to be generated for interacting with the field of the magnetic member to develop a force generally aligned with the magnetic member field.

13. An actuator for inertial stabilization systems as described in claim 10, 11 or 12 further comprising: means for generating terminal force about at least one rotational axis generally perpendicular to the flux lines of the magnetic member field.

14. An actuator for inertial stabilization systems as described in claim 13 wherein said means for generating force about at least one rotational axis further comprises: a plurality of spiral winding pairs mounted on said platen planarly adjacent one another such that, when opposing magnetic fields of different polarity are generated in said windings, force is generated about an axis lying between windings of different polarity.

15. An actuator as described in claim 14 wherein said plurality of spiral winding pairs are mounted in adjacent pairs, one for each rotational axis selected and have the line of intersection between centers of such adjacent pairs transverse to such lines of intersection of other adjacent pairs.

16. Force generating apparatus comprising:
an electrically conductive winding in the form of two spirals extending in generally parallel planes displaced from each other by a predetermined distance along a common axis of the spirals, the spirals being wound in like directions parallel to each other and being joined at their centers to provide a single series current path for conducting current in opposite directions in the two spirals to develop a pair of like magnetic poles along said axis on opposite sides of the winding; and
means for generating a homogeneous magnetic field encompassing said winding and having a direction generally aligned with said axis in order to develop an axial force on said winding.

17. The apparatus of claim 16 further including a generally planar platen positioned between the two spirals and supporting said winding.

18. The apparatus of claim 17 further including a second electrically conductive winding in the form of two spirals mounted on opposite sides of said platen, said spirals being wound in like directions parallel to each other and being joined at their centers to provide a single series current path for conducting current in opposite directions in the two spirals to develop a pair of like magnetic poles along the axis of the second winding on oppposite sides thereof, the second winding being displaced along the platen from the first-mentioned winding, both of said windings being positioned within said homogeneous magnetic field, such that when the two windings are energized oppositely with respect to each other the mutual interaction with the homogeneous magnetic field develops a torsional force on said platen.

19. The apparatus of claim 18 further including an additional pair of conductive windings constructed like the first-mentioned pair of windings and having their respective spirals mounted on opposite sides of the platen, the windings of said second pair being displaced from each other along the platen by a distance aproximately equal to the displacement of the first-mentioned windings but oriented approximately 90° about the platen relative to the orientation of the first-mentioned pair of windings for developing torsional force about an axis in the plane of the platen generally orthogonal to the torsional force axis of the first-mentioned pair.

20. The apparatus of claim 19 further including still another winding constructed as defined in claim 16 and having its spirals mounted on opposite sides of the platen, said another winding being generally situated relative to the two first-mentioned pairs of windings and within said homogeneous magnetic field for developing an axial force on said platen in addition to the torsional forces developed by the respective pairs of windings.

* * * * *